(12) United States Patent
Nazarian et al.

(10) Patent No.: US 12,334,515 B2
(45) Date of Patent: Jun. 17, 2025

(54) SUSTAINABLE, MECHANICALLY RECHARGEABLE, MOLDABLE, AND SPRAYABLE HYDROGEL BATTERY

(71) Applicants: Jonah Isaac Nazarian, Beverly Hills, CA (US); Aidyl Sofia Gonzalez-Serricchio, La Canada, CA (US)

(72) Inventors: Jonah Isaac Nazarian, Beverly Hills, CA (US); Aidyl Sofia Gonzalez-Serricchio, La Canada, CA (US)

( * ) Notice: Subject to any disclaimer, the term of this patent is extended or adjusted under 35 U.S.C. 154(b) by 0 days.

(21) Appl. No.: 18/424,565

(22) Filed: Jan. 26, 2024

(65) Prior Publication Data

US 2024/0413405 A1 Dec. 12, 2024

Related U.S. Application Data

(60) Provisional application No. 63/481,888, filed on Jan. 27, 2023.

(51) Int. Cl.
*H01M 10/38* (2006.01)
*H01M 10/44* (2006.01)
(Continued)

(52) U.S. Cl.
CPC ........... *H01M 10/38* (2013.01); *H01M 10/44* (2013.01); *H01M 50/105* (2021.01);
(Continued)

(58) Field of Classification Search
CPC .... H01M 10/38; H01M 10/44; H01M 50/136; H01M 50/105; H01M 50/51; H01M 2300/0002; H01M 2300/0085
See application file for complete search history.

(56) References Cited

U.S. PATENT DOCUMENTS

| 5,474,860 A | 12/1995 | Abraham |
|---|---|---|
| 2016/0013485 A1 | 1/2016 | Hurwitz |

(Continued)

FOREIGN PATENT DOCUMENTS

| CN | 105206871 A | * | 12/2015 | |
|---|---|---|---|---|
| GB | 2196784 A | * | 5/1988 | ............ H01M 10/08 |

OTHER PUBLICATIONS

Translation CN105206871A (Year: 2015).*
(Continued)

*Primary Examiner* — Jane J Rhee
(74) *Attorney, Agent, or Firm* — Lowe Graham Jones PLLC

(57) ABSTRACT

A battery with an anode, a cathode, and an electrolyte. The electrolyte may be disposed between the anode and the cathode. The electrolyte may comprise sodium chloride, water, polyvinyl alcohol, and borax. The anode, the cathode, and the electrolyte may be disposed within a housing. The battery is configured to recharge in response to external mechanical force applied to the battery. A method of recharging the battery may comprise providing the battery with a reduced charge and applying an external mechanical force to the battery such that the electrolyte is physically manipulated. Physically manipulating the electrolyte increases the electric potential between the anode and the cathode to recharge the battery.

20 Claims, 5 Drawing Sheets

(51) Int. Cl.
H01M 50/105 (2021.01)
H01M 50/136 (2021.01)
H01M 50/51 (2021.01)

(52) U.S. Cl.
CPC ......... H01M 50/136 (2021.01); H01M 50/51 (2021.01); *H01M 2300/0002* (2013.01); *H01M 2300/0085* (2013.01)

(56) References Cited

U.S. PATENT DOCUMENTS

2016/0149256 A1* 5/2016 Leroux ............... H01M 50/514 429/153
2022/0255178 A1* 8/2022 Li ....................... H01M 50/287

OTHER PUBLICATIONS

Meng, Q., Chung, D. D. L. C., & Burstein, G. T. (Nov. 10, 2010). Battery in the form of a cement-matrix composite. Cement and Concrete Composites. Retrieved Mar. 1, 2023, from: https://www.sciencedirect.com/science/article/abs/pii/S0958946510001307.

Kevin M. Winslow, Shin, S. M., Roessler, J. G., Richa, K., Renou, S., Psomopoulos, C. S., Prior, T., Peters, J. F., Peter, A. J., Oliveira, L., Nayaka, G. P., Nan, J., Nagib, S., Mishra, D., Meshram, P., Mehta, R., Lupi, C., Lu, L., . . . Aravindan, V. (Nov. 12, 2017). A review on the growing concern and potential management strategies of waste lithium-ion batteries. Resources, Conservation and Recycling. Retrieved Mar. 1, 2023, from https://www.sciencedirect.com/science/article/abs/pii/S0921344917303774.

M. Azizi, Zhang, X. P., Xiao, R., Wilson, S. C., Uugwanga, M. N., Tao, Y., Sipos, P., Scribner, A. M., Rashed, M. N., Perumal, P., hlander B. O, Möller, A., Micó, C., Martin-Crespo, T., Marabottini, R., Mapani, B., . . . Asati, A. (Mar. 8, 2022). Environmental pollution and depth distribution of metal(loid)s and rare earth elements in mine tailing. Journal of Environmental Chemical Engineering. Retrieved Mar. 1, 2023, from https://www.sciencedirect.com/science/article/abs/pii/S2213343722003992.

Hayder Ali, (Aug. 12, 2022). Preprocessing of spent lithium-ion batteries for recycling: Need, methods, and Trends. Renewable and Sustainable Energy Reviews. Retrieved Mar. 1, 2023, from: https://www.sciencedirect.com/science/article/abs/pii/S136403212200692X.

Kuchhal, Sharma, Battery Waste Management Piyush Kuchhal—Researchgate. Battery Waste Management. Retrieved Mar. 1, 2023, from https://www.researchgate.net/profile/UmeshSharma8/publication/331915207_BATTERY_WASTE_MANAGEMENT/links/5c92ea5445851506d71f6e30/BATTERY-WASTE-MANAGEMENT.pdf.

Qiancheng Zhu, Mingyu Cheng, Bowen Zhang, Kai Jin, Shuo Chen, Zhifeng Ren, Ying Yu, Realizing a Rechargeable High-Performance Cu—Zn Battery by Adjusting the Solubility of $Cu^{2+}$, https://onlinelibrary.wiley.com/doi/abs/10.1002/adfm.201905979.

Costa, C. M., Barbosa, J. C., Gonçalves, R., Castro, H., Del Campo, F. J., & Lanceros-Méndez, S. "Recycling and Environmental Issues of Lithium-Ion Batteries: Advances, Challenges and Opportunities." Energy Storage Materials, vol. 37, 2021, pp. 433-465.

Doose, S., Mayer, J. K., Michalowski, P., & Kwade, A. "Challenges in Ecofriendly Battery Recycling and Closed Material Cycles: A Perspective on Future Lithium Battery Generations." Metals, vol. 11, No. 2, 2021, p. 291. https://doi.org/10.3390/met11020291.

Melin, H. E. "State-of-the-Art in Reuse and Recycling of Lithium-Ion Batteries—A Research Review." Circular Energy Storage, vol. 1, 2019, pp. 1-57.

Verschoor, A. J. "Towards a Definition of Microplastics: Considerations for the Specification of Physico-Chemical Properties."

Bankole, O. E., Gong, C., & Lei, L. "Battery Recycling Technologies: Recycling Waste Lithium Ion Batteries with the Impact on the Environment in-View." Journal of Environment and Ecology, vol. 10, 2013, pp. 14-28. DOI.

Haque, N., Hughes, A., Lim, S., & Vernon, C. "Rare Earth Elements: Overview of Mining, Mineralogy, Uses, Sustainability and Environmental Impact." Resources, vol. 3, No. 4, 2014, pp. 614-635.

* cited by examiner

SUSTAINABLE, MECHANICALLY RECHARGEABLE, MOLDABLE, AND SPRAYABLE HYDROGEL BATTERY

RELATED APPLICATIONS

This application claims the benefit of U.S. provisional patent application 63/481,888, filed Jan. 27, 2023, to Nazarian et al., titled "MOLDABLE, RECHARGEABLE, AND SPRAYABLE HYDROGEL BATTERY, FLEX CHARGE," the entirety of the disclosure of which is hereby incorporated by this reference.

TECHNICAL FIELD

This document relates to rechargeable hydrogel batteries.

BACKGROUND

Batteries are essential in modern life, powering various devices from cell phones to electric vehicles. However, the failure to recycle batteries has far-reaching consequences for environmental and resource sustainability.

Traditional batteries, such as lead-acid, nickel-cadmium, and lithium-ion batteries, contain hazardous materials that pose a significant environmental risk when not disposed of or recycled properly. These toxic substances can leach into the soil and water, causing harm to wildlife and human health and contaminating landfills and groundwater. The environmental footprint of batteries extends beyond their end-of-life disposal. The extraction and processing of raw materials such as lithium, cobalt, and nickel can create pollution and waste, and the manufacturing process itself can generate greenhouse gas emissions.

The limited shapes of batteries can also affect waste and materials. Since batteries are often designed for specific devices, they can vary in size and shape, making it difficult to recycle them efficiently. For example, cylindrical batteries used in laptops and power tools may be easier to recycle than button batteries used in hearing aids or thin, flexible batteries used in wearable devices. Three billion batteries, equivalent to 180,000 tons, are disposed of in America each year alone. 97% of batteries end up in landfills, where they can leach toxic chemicals into the soil and groundwater. This has a highly negative impact on the environment and human health.

Thus, though widely used, traditional batteries create various problems that have not been properly solved. Precious metals are used to form these traditional batteries, leading to increased costs. Additionally, the materials used to form traditional batteries are typically solid and therefore require that the batteries have particular fixed shapes, limiting the versatility of the batteries and the applications where they are suitable.

SUMMARY

Aspects of this document relate to a battery comprising an anode, a cathode, and an electrolyte disposed between the anode and the cathode, wherein the electrolyte comprises sodium chloride, water, polyvinyl alcohol (PVA), and borax, wherein the anode, the cathode, and the electrolyte are disposed within a housing, and wherein the battery is configured to recharge in response to external mechanical force applied to the battery Particular embodiments may comprise one or more of the following features. The electrolyte may be moldable. The housing may comprise a flexible film. The anode, the cathode, and the electrolyte may form a first cell of the battery and the battery may further comprise a second cell comprising a second anode, a second cathode, and a second electrolyte disposed between the second anode and the second cathode, wherein the second electrolyte comprises sodium chloride, water, polyvinyl alcohol (PVA), and borax, wherein the first cell and the second cell are electrically connected in series. The electrolyte may be between about 2% PVA and about 10% PVA. The electrolyte may be between about 2% borax and about 4% borax. The electrolyte may be up to about 8% sodium chloride.

Aspects of this document relate to a battery comprising a plurality of cells electrically connected in series, each cell comprising an anode, a cathode, and an electrolyte disposed between the anode and the cathode, wherein the electrolyte comprises water, polyvinyl alcohol (PVA), and borax, wherein the battery is configured to recharge in response to external mechanical force applied to the battery.

Particular embodiments may comprise one or more of the following features. The anode, the cathode, and the electrolyte may be disposed within a housing. The anode may comprise copper and the cathode may comprise zinc. The battery may comprise two to six cells. The battery may have a voltage between 1 and 3 volts. The electrolyte may be between about 2% PVA and about 10% PVA, between about 2% borax and about 4% borax, and up to about 8% sodium chloride. The battery may be moldable such that the battery can be formed into an irregular shape.

Aspects of this document relate to a method of recharging a battery, the method comprising providing a battery with a reduced charge, the battery having an anode, a cathode, and a electrolyte disposed between the anode and the cathode, wherein the electrolyte comprises water, polyvinyl alcohol (PVA), and borax, and applying an external mechanical force to the battery such that the electrolyte is physically manipulated, wherein physically manipulating the electrolyte increases the electric potential between the anode and the cathode to recharge the battery.

The method may further comprise removing the battery from an electronic device and placing the battery in a recharging station, wherein the recharging station is configured to apply the external mechanical force. Applying an external mechanical force to the battery may comprise squeezing the battery. Applying an external mechanical force to the battery may be done at a rate of between 1 and 4 times per second. The method may further comprise electrically coupling the battery to a device after the battery is recharged and powering the device with the battery. The electrolyte may be between about 2% PVA and about 10% PVA, between about 2% borax and about 4% borax, and up to about 8% sodium chloride.

The foregoing and other aspects, features, and advantages will be apparent from the DESCRIPTION and DRAWINGS, and from the CLAIMS.

BRIEF DESCRIPTION OF THE DRAWINGS

Implementations will hereinafter be described in conjunction with the appended and/or included DRAWINGS, where like designations denote like elements, and.

DETAILED DESCRIPTION

Figure 1:
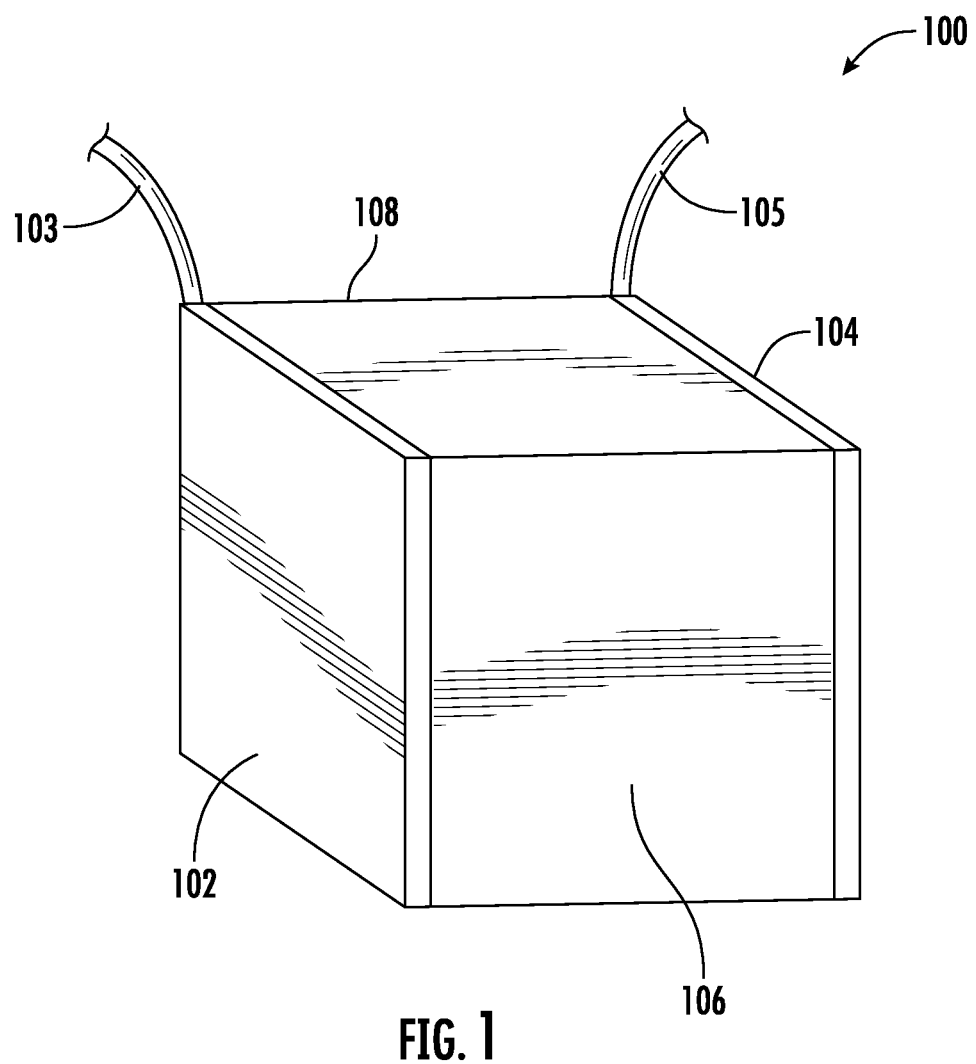
FIG. 1 is a perspective schematic view of a single cell of a rechargeable hydrogel battery according to some embodiments.

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

Throughout the description and claims of this specification, the words "comprise" and "contain" and variations of the words, for example "comprising" and "comprises," mean "including but not limited to," and are not intended to (and do not) exclude other components.

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term "plurality," as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The production of traditional batteries, such as lithium, alkaline, carbon zinc, silver oxide, and zinc air, consumes a significant amount of energy and results in the harmful contamination of groundwater and surface water. The present disclosure is related to a sustainable and environmentally friendly solution that creates a rechargeable, moldable battery that utilizes mechanical energy for recharging. The battery disclosed herein has the potential to replace current battery pollutants and reduce carbon footprints.

The present disclosure is related to hydrogel batteries. In some embodiments, the batteries are rechargeable and comprise an electrolyte that is moldable and/or sprayable. Embodiments of batteries disclosed herein introduce a number of benefits over traditional batteries, including environmental sustainability, cost-effectiveness, versatility, safety, rechargeability, and efficiency.

To be environmentally sustainable, the batteries can use mechanical energy to recharge, making them more sustainable and reducing the environmental impact of the batteries. Instead of frequently replacing batteries, the batteries can be mechanically recharged, for instance, through hand manipulation or harnessing energy from ocean waves.

In some embodiments, the batteries demonstrate improved cost-effectiveness by abstaining from using precious metals such as lithium, cobalt, and nickel. This makes the batteries more affordable to produce and simplifies their safe disposal. The adaptability of the batteries stems from the unique material employed, enabling the batteries to be molded into diverse shapes and sizes not achievable with conventional counterparts. Consequently, the disclosed batteries find utility in applications unsuitable for traditional battery technologies.

In specific embodiments, the hydrogel batteries disclosed herein boast heightened safety compared to traditional counterparts, as they refrain from releasing harmful chemicals, such as lead and cadmium, to the same extent that have the potential to contaminate groundwater and surface water. As previously highlighted, these batteries can be recharged using external mechanical energy, obviating the need for replacement upon power depletion.

The hydrogel batteries described herein exhibit excellent charge retention, ensuring efficient storage energy utilization. These hydrogel battery implementations offer a sustainable and environmentally friendly solution by harnessing mechanical energy instead of consuming substantial power, thereby mitigating the risk of groundwater and surface water contamination. A battery's moldable feature in specific configurations allows for efficient space utilization and accommodation of irregularly shaped objects. Such batteries enable users to minimize their carbon footprint, creating a cleaner environment.

Individuals and businesses can benefit from the hydrogel batteries disclosed herein. For instance, environmentalists and eco-conscious consumers may find these batteries appealing to minimize their environmental impact and embrace sustainable technology. Those seeking a cost-effective power solution may also be interested, as the absence of precious metals makes these batteries more economical than their traditional counterparts.

In specific configurations, manufacturers and designers of consumer electronics, appliances, and various products may find interest in these batteries due to their moldable features, providing enhanced design flexibility. The moldable, rechargeable hydrogel battery configurations can serve as versatile power sources in various electronic devices, including portable lights, fans, heaters, radios, speakers, power banks, and other portable devices. This versatility makes these batteries appealing to small businesses and entrepreneurs.

In certain instances, the hydrogel batteries are well-suited for powering devices and equipment in outdoor settings, including camping lights, portable radios, and speakers. This makes the batteries an appealing choice for outdoor enthusiasts and campers. Additionally, industrial and commercial companies may find interest in these batteries for diverse applications such as powering sensors, monitoring equipment, and other industrial tools. Government agencies may consider using hydrogel batteries to power sensors and monitoring equipment for public safety, disaster management, and environmental monitoring in specific scenarios.

Figure 2:
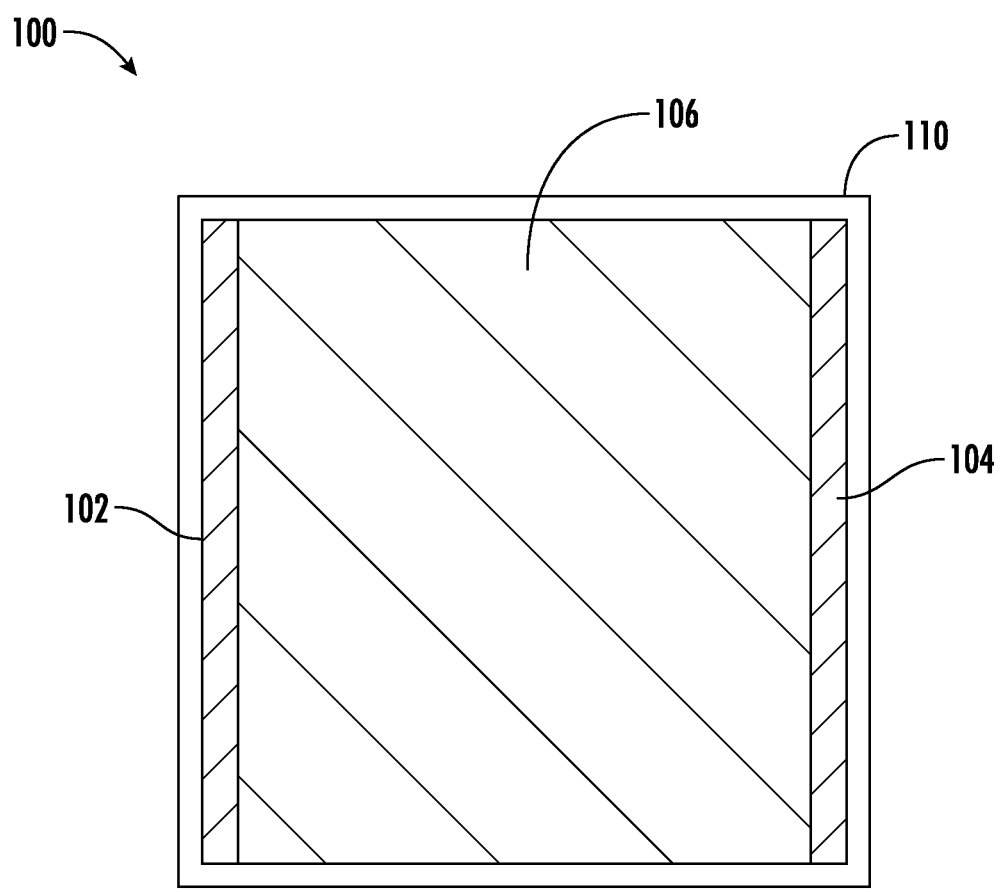
FIG. 2 is a cross section schematic view of the battery cell shown in FIG. 1 according to some embodiments.

In some embodiments, as shown, for example, in FIGS. 1-2, a rechargeable hydrogel battery 100 comprises at least one cell 108. It should be noted that the figures discussed herein illustrate particular aspects of the subject matter disclosed herein without suggesting any particular shape for the battery 100. In some embodiments, cell 108 comprises an anode 102, a cathode 104, and an electrolyte positioned between the anode 102 and the cathode 104. In some embodiments, the electrolyte 106 is a hydrogel 106. The anode 102 and the cathode 104 may be formed as conductive plates, strips, wires, discs, or any other shape. Thus, the anode 102 and the cathode 104 may be rectangular, circular, or any other shape. In some embodiments, the anode 102 and the cathode 104 are different shapes from each other.

Anode 102 may be formed of a variety of different materials. For example, in some embodiments, the anode 102 is formed of one of the following materials: copper, a metal oxide (such as copper oxide, lithium oxide, or graphite oxide), zinc, magnesium, graphite, silicon, titanium dioxide, sodium titanate, carbon nanotubes, manganese dioxide, and the like. Several of these options provide non-toxic, environmentally friendly materials. In some embodiments, the anode 102 may be coated to help avoid short-circuiting because of dendrite formation. The anode 102 may be coated with a material such as polyethylene oxide, ionic liquids such as 1-ethyl-3-methylimidazolium tetrafluoroborate, and cellulose. Other materials may also be selected for the anode 102.

In some embodiments, anode 102 may be attached to one or more leads 103. Leads 103 may be used to electrically couple cell 108 to another cell 108 or to a device that battery 100 will power. In some embodiments, leads 103 are permanently attached to anode 102. In some embodiments, leads 103 may be removably coupled to anode 102. Leads 103 may take a variety of forms. Moreover, in some instances, there may be no need for a lead 103 (e.g., anode 102 may connect directly to an electrical circuit of a device).

Cathode 104 may be formed of a variety of different materials. For example, in some embodiments, cathode 104 is formed of one of the following materials: zinc, lithium, graphite, platinum, copper, iron phosphate, manganese oxide, polypyrene, sodium nickel chloride, vanadium pentoxide, and the like. Several of these options provide non-toxic, environmentally friendly materials. As with the anode 102, the cathode 104 may be coated with a material such as carbon. Additionally, the cathode 104 may include additives such as bismuth salts or polyvinylidene fluoride. In some embodiments, cathode 104 may be an air cathode. Other materials may also be selected for the cathode 104.

In some embodiments, cathode 104 may be attached to one or more leads 105. Leads 105 may be used to electrically couple cell 108 to another cell 108 or to a device that battery 100 will power. In some embodiments, leads 105 are permanently attached to cathode 104. In some embodiments, leads 105 may be removably coupled to cathode 104. Leads 105 may take a variety of forms. Moreover, in some instances, there may be no need for a lead 105 (e.g., cathode 104 may connect directly to an electrical circuit of a device).

In some embodiments, the hydrogel 106 may be disposed between the anode 102 and the cathode 104. In some embodiments, the hydrogel 106 is attached to the anode 102 and the cathode 104. The process of attaching the hydrogel 106 to the anode 102 and the cathode 104 may comprise any of the following steps. The surfaces of the anode 102 and the cathode 104 may be prepared, ensuring cleanliness and, if necessary, applying surface treatments. The electrolyte material, either synthesized or selected, may then be integrated with the electrode surfaces, including the anode 102 and the cathode 104. This integration may be achieved through methods like coating, casting, or embedding the hydrogel 106, ensuring uniform coverage and adhesion. Subsequently, crosslinking or curing may be performed to solidify the electrolyte structure. Finally, the assembled battery components may undergo testing to assess performance, and the integration process may be optimized accordingly.

When the hydrogel 106 sets, a connection is established between the hydrogel 106 and both the anode 102 and the cathode 104. This connection or integration helps to ensure a cohesive and functional relationship between the hydrogel 106 and the electrodes (the anode 102 and the cathode 104, thus contributing to the overall performance and stability of the battery 100.

The hydrogel 106 may be formed of one or more substances that allow the battery 100 to recharge in response to external mechanical force applied to battery 100. In some embodiments, applying the external mechanical force to the battery 100 comprises one or more of squeezing, shaking, mixing, vibrating, flexing, agitating, applying pressure to, or otherwise physically manipulating the hydrogel 106.

As used herein, a hydrogel is a mixture of porous, permeable solids and at least 10% by weight or volume of interstitial fluid composed completely or mainly by water. In some embodiments, hydrogel 106 comprises an electrolyte solution. In some embodiments, hydrogel 106 comprises water. In some embodiments, the water is distilled water. In some embodiments, hydrogel 106 comprises polyvinyl alcohol (PVA). PVA is a synthetic polymer used in various industrial and household applications, including adhesives, coatings, and textiles. In some embodiments, hydrogel 106 comprises borax. In some embodiments, hydrogel 106 is an electrolyte solution that comprises sodium chloride (NaCl) or sodium hydroxide (NaOH). In some embodiments, hydrogel 106 comprises sodium chloride, water, polyvinyl alcohol, and borax. In some embodiments, hydrogel 106 consists of sodium chloride, water, polyvinyl alcohol, and borax. In some embodiments, hydrogel 106 consists essentially of sodium chloride, water, polyvinyl alcohol, and borax.

Hydrogel 106 exhibits varying compositions with different percentages of water, electrolytes (e.g., NaCl), PVA, and borax. Hydrogel 106 may have different percentages of water, electrolytes (e.g., NaCl), PVA, and borax. Forming the hydrogel 106 to have different percentages of electrolytes, PVA, and/or borax provides different characteristics to the hydrogel 106. These characteristics may provide a more efficient, durable, and reliable battery operation, enhancing its overall performance and longevity, and also may allow the battery to be rechargeable and have a longer lifespan than traditional batteries. Similarly, adjusting the percentage of PVA and/or the percentage of NaCl alters the consistency and texture of the hydrogel 106 both when heated and when cooled, as explained in more detail below. Different percentages can also lead to improved corrosion resistance for the battery 100. In addition to the characteristics mentioned earlier, specific alterations in the percentages of water, NaCl, PVA, and borax within the hydrogel 106 can also impact: ionic conductivity, charge/discharge efficiency, cycle life, electrochemical stability, and self-discharge rate, etc.

In some embodiments, the hydrogel 106 may be between about 0%-15% PVA, about 0%-10% borax, and/or about 0%-15% sodium chloride. In some embodiments, the hydrogel 106 may be between about 0%-10% PVA, about 0%-4% borax, and/or about 0%-12.5% sodium chloride. However, other percentages may be implemented. For example, the hydrogel 106 may be between about 2% PVA and about 10% PVA, between about 2% borax and about 4% borax, and/or between about 0% sodium chloride and about 8% sodium chloride. Percentages expressed herein represent the weight percentage of each component relative to the overall composition of the hydrogel 106. For example, in some iterations, the hydrogel 106 may consist of 4% PVA, 4% borax, and 6.25% sodium chloride, indicating the proportion of each component by weight in the entire electrolyte composition. The chosen percentages are designed to impart specific characteristics to the hydrogel 106, such as improved ionic conductivity, stability, and corrosion resistance (which can be addressed with the additives or using different nontoxic metals) for the battery 100, ultimately influencing factors like recharging time and battery longevity. In some embodiments, the hydrogel 106 may be 4% PVA. In some embodiments, hydrogel 106 may be 4% borax. In some embodiments, hydrogel 106 may be 6.25% sodium chloride. The concentration of hydrogel may impact battery longevity and recharging time.

Different concentrations of NaCl, PVA, and borax are contemplated for different embodiments of the hydrogel 106. These different embodiments of the hydrogel 106 experience different levels of corrosion and take different amounts of time to recharge, as explained in more detail below with reference to specific concentrations. Additionally, these different concentrations affect the physical properties of the hydrogel 106.

In some embodiments, hydrogel 106 comprises 6.25% NaCl, 4% PVA, and 4% borax. When formed with this composition, hydrogel 106 has demonstrated a 40% recharge of its initial voltage. Additionally, although hydrogels 106 with this composition take longer to recharge, such embodiments may experience less visible corrosion on the copper. In embodiments that include 6.25% NaCl, 4% PVA, and 4% borax that is mixed at a temperature of 100 degrees Celsius, the hydrogel 106 is initially soft and pliable, and therefore can be molded to any desired shape, but once the hydrogel 106 cools, the hydrogel 106 sets in the shape of its container.

In certain embodiments, hydrogel 106 comprises 0% NaCl, 4% PVA, and 4% borax. This formulation enhances moldability, ensuring prolonged flexibility and malleability. Additionally, its texture makes it suitable for spraying using a spray bottle. Thus, embodiments incorporating these percentages may be especially helpful in devices with unique battery port dimensions. Additionally, such embodiments may recharge easily. To form embodiments of a hydrogel 106 with 0% NaCl, 4% PVA, and 4% borax, and to form other similar embodiments with a low salt content, the borax and the PVA may be separately suspended in distilled water at the proper percentages, and the borax solution may be added to the PVA solution. In some embodiments, the borax solution is added to the PVA solution at a rate that is slow enough to allow the PVA to fully react with the borax.

In some embodiments, hydrogel 106 comprises 6.25% NaCl, 10% PVA 4% borax. These embodiments of hydrogel 106 exhibit slower voltage decay, and thus are able to reach a higher initial voltage than any of the other embodiments tested, are able to maintain this voltage for a longer period of time and experience less corrosion than some other embodiments. However, embodiments with these percentages may have a lower recharge efficiency. Embodiments that include 6.25% NaCl, 10% PVA, and 4% borax may also have greater elasticity and stretchiness when heated as compared to similar embodiments with 4% PVA and 2% PVA.

In some embodiments, hydrogel 106 comprises 6.25% NaCl, 2% PVA, and 2% borax. Embodiments with 6.25% NaCl, 2% PVA, and 2% borax are moderately flexible and moldable, but less so than embodiments with 4% or 10% PVA, and solidify at a faster rate.

The moldability of the hydrogel 106 has a variety of beneficial applications. For example, the hydrogel 106 easily conforms to different surfaces and shapes, making it a great fit for unconventional objects. Additionally, the hydrogel 106 can be used on various substrates, making it handy for electronics, wearables, and flexible devices. The sprayable form also simplifies the manufacturing process, providing a cost-effective and efficient way to apply the hydrogel 106 to desired surfaces, and enables quick prototyping and experimentation in battery design due to its easy application. By directly spraying the hydrogel 106 onto surfaces, there is also potential to cut down on additional materials and complex manufacturing processes, possibly reducing the environmental impact of battery production. Sprayable batteries also can be used in situations where traditional battery forms might be difficult to implement, broadening access to energy storage solutions. The sprayable hydrogel 106 allows for precise application and customization of the battery's size and shape, offering flexibility in design. Additionally, the electrolyte's lightweight nature contributes to an overall weight reduction of the battery, making it suitable for applications where weight is a crucial factor. The hydrogel 106, with its low toxicity and biocompatibility, enhances the safety of the battery 100, particularly in applications involving skin contact or medical devices. Lastly, the sprayable hydrogel 106 opens up possibilities for innovative applications, like developing energy storage solutions on unconventional surfaces or integrating batteries into textiles.

In some embodiments, anode 102, cathode 104, and hydrogel 106 are disposed within a housing 110 configured to retain the hydrogel 106 between the anode 102 and the cathode 104, as shown in FIG. 2. In some embodiments, housing 110 comprises a flexible housing, such as a flexible film. A plastic film may be used as the flexible film. Other housings may also be used that retain hydrogel 106 between anode 102 and cathode 104 and allow a mechanical external force to be applied to battery 100 such that recharging may occur.

Figure 4:
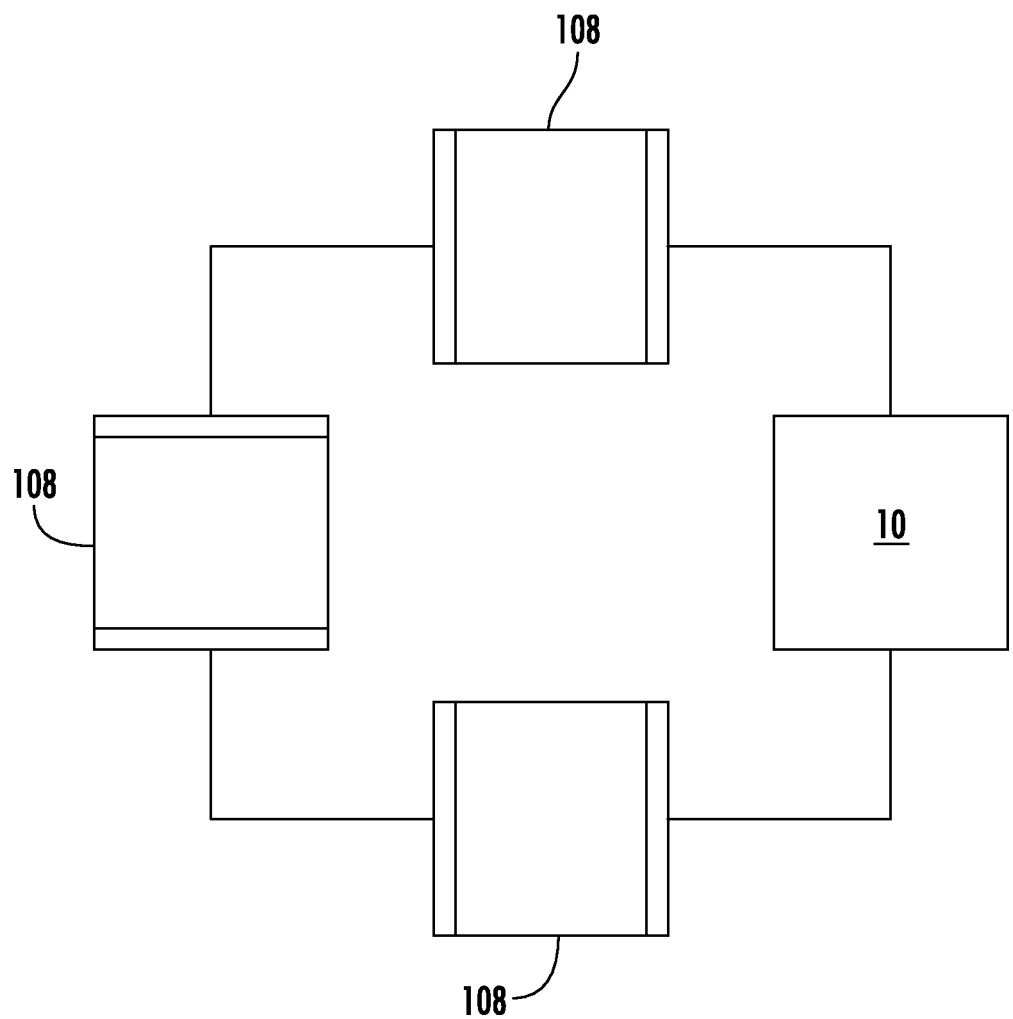
FIG. 4 is a schematic of a rechargeable hydrogel battery operatively coupled to an electrical device according to some embodiments.

In some embodiments, battery 100 may be used to provide power to a device, such as the devices discussed above or other devices. For example, as shown schematically in FIG. 4, one or more cells 108 may be used as a battery to power a device 10. In some embodiments, each of the anode 102 and the cathode 104 may be configured to electrically couple with device 10 to provide power to the device 10, as shown in FIG. 4. As discussed above, the electrical connection may be through leads 103 and 105, as shown in FIG. 1, or by any other electrical connection between anode 102 and cathode 104 to the circuit of device 10. The battery 100 may be configured to provide enough voltage for a variety of applications. In some embodiments, battery 100 may have a voltage of between 0.5 and 5 volts, or between 1 and 3 volts (e.g., 1, 1.5, 2, 2.5, 3 volts).

The voltage output of the battery 100 may be influenced by a variety of factors, such as the composition, concentration, and volume of the hydrogel 106 and the surface area of the electrodes (the anode 102 and the cathode 104). For example, the composition and concentration of the hydrogel 106, including the percentages of PVA and borax, plays a significant role in the voltage output, as explained above. Additionally, the volume of the hydrogel 106 may also influence the voltage and/or lifespan of the battery, with a larger volume resulting in a different voltage compared to a smaller volume due to the overall quantity of active material available for electrochemical reactions. The surface area of the anode 102 and the cathode 104 may also affect the voltage, with a larger surface area potentially enhancing the electrochemical reactions.

Figure 3:
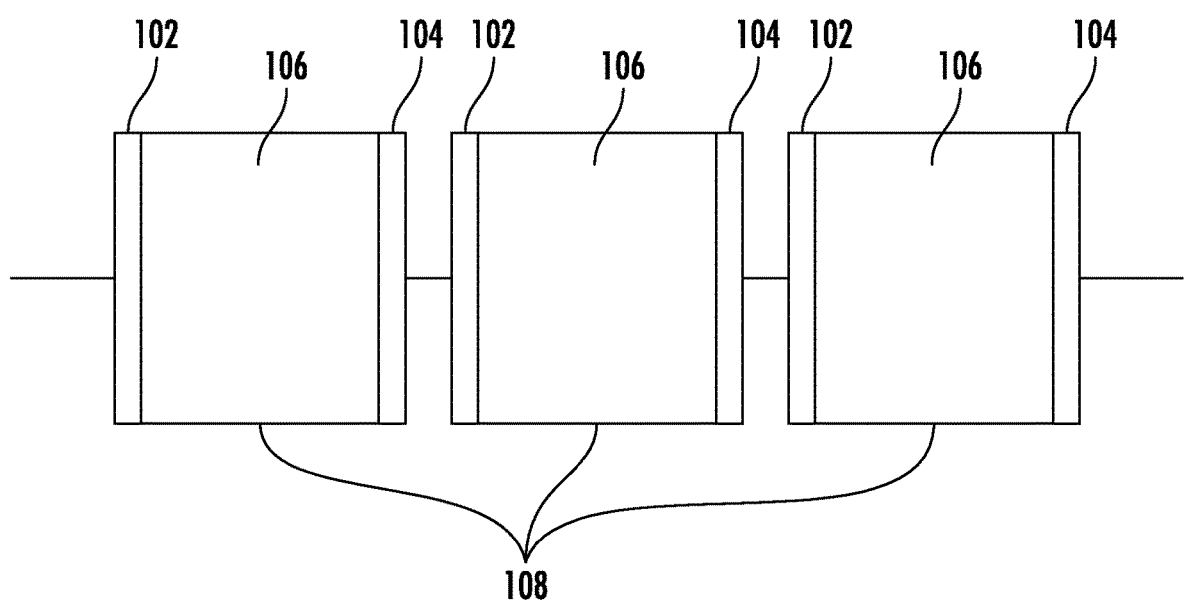
FIG. 3 is a schematic view of multiple cells of a rechargeable hydrogel battery electrically connected in series according to some embodiments.

In some embodiments, multiple battery cells 108 may be electrically connected in series as shown in FIGS. 3 and 4 so that a higher voltage can be obtained. Any number of battery cells 108 may be connected in series, depending on the desired voltage. For example, in some embodiments, battery 100 may comprise between two and ten cells 108 electrically connected in series. For example, battery 100 may comprise four cells 108 electrically connected in series. As another example, battery 100 may comprise two to six cells 108. Battery 100 may have other numbers of cells 108, including more than ten cells 108.

The present disclosure also relates to a process of manufacturing a battery (such as battery 100). The process of manufacturing the battery 100 should be done in a clean and controlled environment to ensure the integrity of the battery 100. The hydrogel 106 can be formed by mixing the desired amounts of electrolytes and PVA with distilled water until a homogeneous mixture is achieved. In some embodiments, saltwater may be used in place of distilled water, in which case additional electrolytes may not need to be added. The borax and additional distilled water or saltwater may then be added, though the borax may also be added at the same time as the PVA. In some embodiments, each of the electrolytes, the PVA, and/or the borax may be added to separate containers of water to precisely achieve the desired composition, and then may be added together. For example, 2-4 grams of borax may be added to 96-98 mL of water such that the total of grams of borax and mL of water equals 100, and 2-10 grams of PVA may be added to an additional, separate 90-98 mL of water such that the total of grams of PVA and mL of water equals 100. In some embodiments, 0-10 grams of NaCl may be added to 90-100 mL of water such that the total of grams of NaCl and mL of water equals 100. Once these separate solutions have been mixed, then the borax solution and the PVA solution (and the NaCl solution) may be added together in desired quantities to get the desired composition of hydrogel 106. The PVA-borax-electrolyte solution may be mixed until a homogeneous mixture is achieved. The solution may then be heated and/or stirred. In some embodiments, a cloudy white gel forms. The borax, when combined with PVA and water, creates the hydrogel 106, a slime-like substance with unique properties, such as viscosity and elasticity. This hydrogel 106 can then be shaped and molded as desired. The anode 102 and the cathode 104 may then be attached to the hydrogel 106. The anode 102, cathode 104, and hydrogel 106 may be disposed within a flexible housing 110.

The present disclosure is also related to a method of recharging a battery. This method may comprise providing a battery 100 as described above that has at least one cell 108 with an anode 102, a cathode 104, and a hydrogel 106 disposed between the anode 102 and the cathode 104. The battery 100 may be provided with a reduced charge, in need of being recharged. The method may also comprise applying an external mechanical force to the battery such that the hydrogel is physically manipulated. In some embodiments, physically manipulating the hydrogel 106 increases the electric potential between the anode 102 and the cathode 104 to recharge the battery.

Applying an external mechanical force to the battery 100 may be conducted in a variety of ways. In some embodiments, applying an external mechanical force to battery 100 comprises squeezing, shaking, mixing, vibrating, flexing, agitating, and/or applying pressure to the hydrogel 106. This allows the battery 100 to recharge by providing mechanical energy to the hydrogel 106, such as by squeezing, shaking, mixing, vibrating, flexing, agitating, applying pressure to, or otherwise physically manipulating the hydrogel 106. Different methods of charging may be more or less effective depending on the composition of the battery 100. Additionally, effectiveness and speed of recharge may depend on factors such as the intensity of the mechanical force, the composition of the hydrogel 106, and the design of the battery 100. In some embodiments, additional methods of providing mechanical energy may also be utilized, such as vibrations or harnessing energy from ocean wave. In some embodiments, applying an external mechanical force to the battery 100 is done repeatedly over time to recharge battery 100. For example, applying an external mechanical force to the battery 100 may be done at a rate of between 1 and 4 times per second. Applying an external mechanical force at a higher frequency may lead to more rapid mechanical energy transfer and therefore increase the charging speed. As mentioned above, the hydrogel 106 is configured to convert this mechanical energy to electric potential energy for later use by the electrical device 10.

In some embodiments, battery 100 may be recharged through application of an external mechanical force without removing battery 100 from a device 10. For example, devices 10 may have a housing for battery 100 that is flexible enough to allow for application of an external mechanical force to battery 100. In some embodiments, battery 100 may be removed from device 10.

Figure 5:
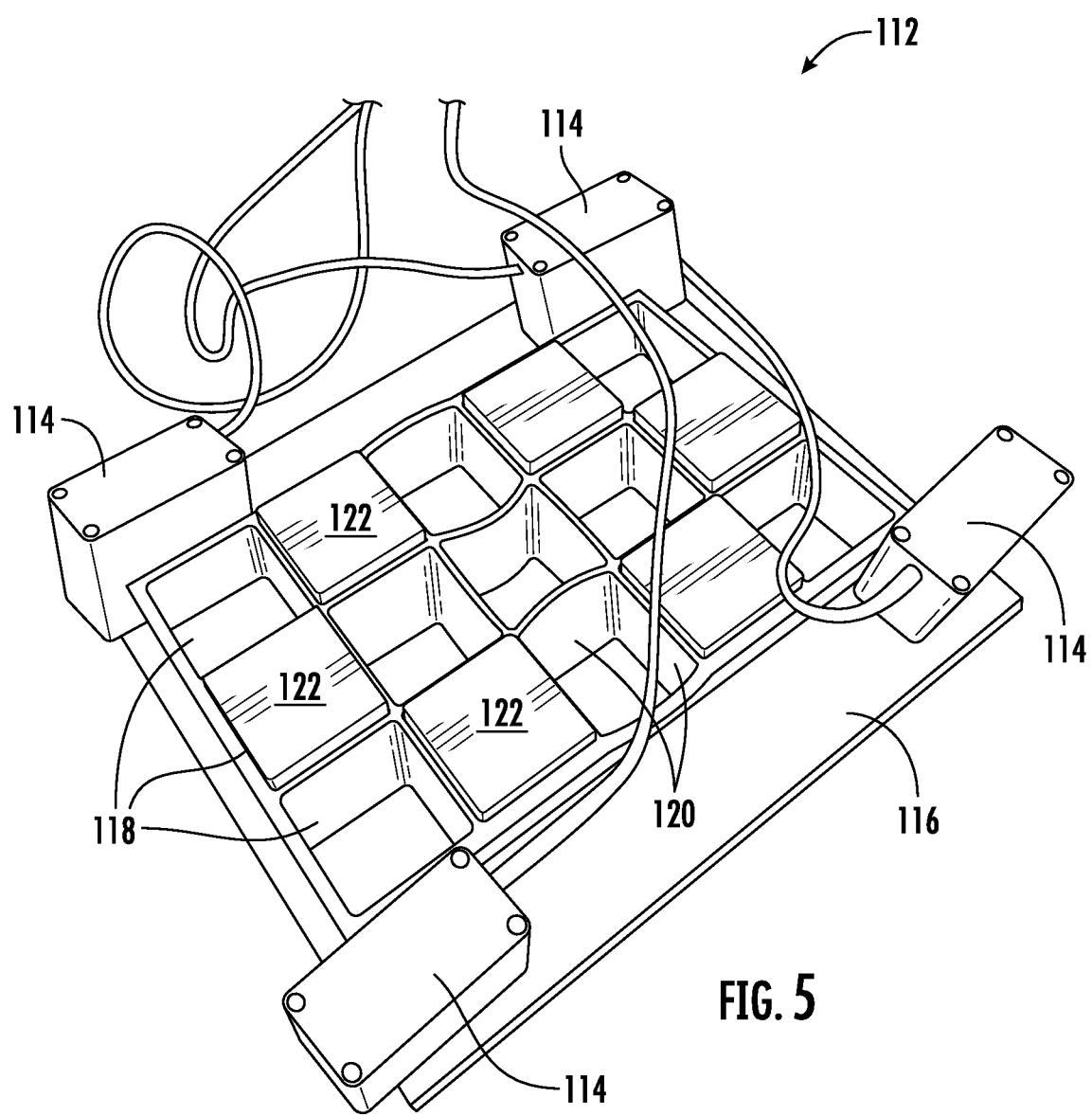
FIG. 5 is a perspective view of a recharging station for a rechargeable hydrogel battery according to some embodiments.

In some embodiments, an external mechanical force (e.g., squeezing battery 100) may be applied manually. In some embodiments, an external mechanical force (e.g., squeezing battery 100) may be applied with a recharging station, such as recharging station 112 shown in FIG. 5. Thus, the recharging station is configured to recharge the battery 100 by applying an external mechanical force.

The recharging station 112 may have one or more actuators 114 and a base 116 configured to support the actuators 114. In some embodiments, the base 116 is formed of PLA. The actuators 114 are configured to exert the external mechanical force on the battery 100. This may be done directly by placing the battery 100 adjacent to the actuators 114 or may be done indirectly by placing the battery 100 or individual cells 108 of the battery 100 in a position, such as in a receptacle, where the force from the actuators 114 can be transferred to the battery 100.

The battery 100 and/or recharging station 112 may be configured with a plurality of compartments 118 for holding cells 108 of the battery 100. In some embodiments, each cell 108 may be configured to have up to a 25 mL volume. The compartments 118 may be formed of silicone or any other material. Flexible materials allow the hydrogel 106 to be physically manipulated through the compartment walls 120. When used as part of the battery 100, the compartments 118 may help to contain the hydrogel 106 within each cell 108 and provide structure for the anode 102 and the cathode 104 to attach to. Such embodiments may also be easier to interface with a recharging station 112 because the cells 108 will line up with the position of the one or more actuators 114 used to physically manipulate the hydrogel 106.

In some embodiments, the recharging station 112 also has one or more space-occupying cubes 122 positioned within a portion of the plurality of compartments 118. This helps to avoid situations where the compartments 118 themselves absorb the energy from the actuators 114 by flexing around the actuators 114. The cubes 122 thus help to transfer as much energy as possible into the hydrogel 106.

In some embodiments, the actuators 114 are servos. The servos may be 4.8 v, 13.5 kg/cm torque servos. Alternatively, the servos may have a stall torque of 240 oz-in (17.2 kg/cm). In some embodiments, the servos are GoBuilda 2000 Series Dual Mode Servo servos. Other alternatives will be apparent to a person of skill in the art. The actuators 114 may be programmable through code to exert pressure, force, or vibrations in a desired manner. Thus, the recharging station 112 may be controlled with a controller such as an Arduino. A particular advantage of using a controller is that the actuators 114 can be engaged simultaneously and/or synchronously. In some embodiments, this synchronous movement at a uniform rate allows for equal pressure distribution to each of the cells 108 in embodiments where actuators 114 are positioned on both sides of a cell 108 or positioned to transfer a force to both sides of the cell 108.

Recharging battery 100 may comprise placing the battery 100 (or cells 108 of battery 100) in the recharging station 112. The method may also comprise moving the compartments 118 of the recharging station 112 with the actuator 114 to exert the external mechanical force on each of the cells 108 of the battery 100.

In some embodiments, the method comprises electrically coupling the battery 100 to a device 10 after the battery 100 is recharged and powering the device 10 with the battery 100.

As mentioned above, embodiments of the battery 100 disclosed herein is an environmentally just battery with key unique features. One of these key features is the ability to convert external mechanical force into electrical energy. By using a PVA, borax, and electrolyte (NaCl) hydrogel 106, the battery 100 can be shaped and molded into various forms, making it more versatile. Additionally, the components of the hydrogel 106 allow for excellent ionic conductivity and stability, making the battery 100 more efficient. This also allows the battery 100 to be rechargeable and to have a longer lifespan than traditional batteries. The battery 100 was created to be safer than traditional batteries, as it does not release chemicals that can contaminate groundwater and surface water to the same extent. Additionally, the lack of precious metals in the battery's composition makes it less expensive to produce and easier to dispose of safely.

Regarding efficiency, the battery 100 has high charging retention. One cell 108 of a 2%-4% borax and 2%-10% PVA concentration battery 100 can produce an initial voltage of 0.71 volts. Over the course of a week, this voltage decreases, but can be recharged by applying an external mechanical force to the battery 100. Thus, the battery 100 disclosed herein offers a sustainable, cost-effective, versatile, safe, and efficient power solution that can be shaped and molded to suit various applications and uses. Creating a rechargeable battery without generating waste or pollution holds promise for reducing the carbon footprint without compromising current technology.

Many additional implementations are possible. Further implementations are within the CLAIMS.

It will be understood that implementations of the rechargeable battery include but are not limited to the specific components disclosed herein, as virtually any components consistent with the intended operation of various rechargeable batteries may be utilized. Accordingly, for example, it should be understood that, while the drawings and accompanying text show and describe particular rechargeable battery implementations, any such implementation may comprise any shape, size, style, type, model, version, class, grade, measurement, concentration, material, weight, quantity, and/or the like consistent with the intended operation of rechargeable batteries.

The concepts disclosed herein are not limited to the specific rechargeable batteries shown herein. For example, it is specifically contemplated that the components included in particular rechargeable batteries may be formed of any of many different types of materials or combinations that can readily be formed into shaped objects and that are consistent with the intended operation of the rechargeable battery. For example, the components may be formed of: rubbers (synthetic and/or natural) and/or other like materials; glasses (such as fiberglass), carbon-fiber, aramid-fiber, any combination therefore, and/or other like materials; elastomers and/or other like materials; polymers such as thermoplastics (such as ABS, fluoropolymers, polyacetal, polyamide, polycarbonate, polyethylene, polysulfone, and/or the like, thermosets (such as epoxy, phenolic resin, polyimide, polyurethane, and/or the like), and/or other like materials; plastics and/or other like materials; composites and/or other like materials; metals, such as zinc, magnesium, titanium, copper, iron, steel, carbon steel, alloy steel, tool steel, stainless steel, spring steel, aluminum, and/or other like materials; and/or any combination of the foregoing.

Furthermore, rechargeable batteries may be manufactured separately and then assembled together, or any or all of the components may be manufactured simultaneously and integrally joined with one another. Manufacture of these components separately or simultaneously, as understood by those of ordinary skill in the art, may involve 3-D printing, extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular rechargeable battery implementations, it should be readily apparent that a number of modifications may be made without departing from the spirit thereof and that these implementations may be applied to other implementations disclosed or undisclosed. The presently disclosed rechargeable batteries are, therefore, to be considered in all respects as illustrative and not restrictive.

We claim:

1. A battery comprising:
   an anode;
   a cathode; and
   a hydrogel electrolyte disposed between the anode and the cathode, wherein the hydrogel electrolyte comprises sodium chloride, water, polyvinyl alcohol (PVA), and borax,
   wherein the anode, the cathode, and the hydrogel electrolyte are disposed within a housing, and
   wherein the battery is configured to recharge in response to external mechanical force applied to the battery, wherein the external mechanical force comprises physically manipulating the hydrogel electrolyte.

2. The battery of claim 1, wherein the electrolyte is moldable.

3. The battery of claim 1, wherein the housing comprises a flexible film.

4. The battery of claim 1, wherein the anode, the cathode, and the electrolyte form a first cell of the battery, the battery further comprising a second cell, the second cell comprising:
   a second anode;
   a second cathode; and
   a second electrolyte disposed between the second anode and the second cathode, wherein the second electrolyte comprises sodium chloride, water, polyvinyl alcohol (PVA), and borax,
   wherein the first cell and the second cell are electrically connected in series.

5. The battery of claim 1, wherein the electrolyte is between about 2% PVA and about 10% PVA.

6. The battery of claim 1, wherein the electrolyte is between about 2% borax and about 4% borax.

7. The battery of claim 1, wherein the electrolyte is up to about 8% sodium chloride.

8. A battery comprising:
   a plurality of cells electrically connected in series, each cell comprising:
   an anode;
   a cathode; and
   an electrolyte disposed between the anode and the cathode, wherein the electrolyte comprises water, polyvinyl alcohol (PVA), and borax;
   wherein the battery is configured to recharge in response to external mechanical force applied to the battery by the electrolyte converting mechanical energy from the external mechanical force to electric potential energy.

9. The battery of claim 8, wherein the anode, the cathode, and the electrolyte are disposed within a housing.

10. The battery of claim 8, wherein the anode comprises copper, and wherein the cathode comprises zinc.

11. The battery of claim 8, wherein the battery comprises two to six cells.

12. The battery of claim 8, wherein the battery has a voltage between 1 and 3 volts.

13. The battery of claim 8, wherein the electrolyte is between about 2% PVA and about 10% PVA, between about 2% borax and about 4% borax, and up to about 8% sodium chloride.

14. The battery of claim 8, wherein the battery is moldable such that the battery can be formed into an irregular shape.

15. A method of recharging a battery, the method comprising:
   providing a battery with a reduced charge, the battery having an anode, a cathode, and a electrolyte disposed between the anode and the cathode, wherein the electrolyte comprises water, polyvinyl alcohol (PVA), and borax; and
   applying an external mechanical force to the battery such that the electrolyte is physically manipulated, wherein physically manipulating the electrolyte increases the electric potential between the anode and the cathode to recharge the battery.

16. The method of claim 15, further comprising:
   removing the battery from an electronic device; and
   placing the battery in a recharging station, wherein the recharging station is configured to apply the external mechanical force.

17. The method of claim 15, wherein applying an external mechanical force to the battery comprises squeezing the battery.

18. The method of claim 15, wherein applying an external mechanical force to the battery is done at a rate of between 1 and 4 times per second.

19. The method of claim 15, further comprising:
   electrically coupling the battery to a device after the battery is recharged; and
   powering the device with the battery.

20. The method of claim 15, wherein the electrolyte is between about 2% PVA and about 10% PVA, between about 2% borax and about 4% borax, and up to about 8% sodium chloride.

* * * * *